United States Patent
Bhimanadhuni et al.

(10) Patent No.: US 10,452,404 B2
(45) Date of Patent: Oct. 22, 2019

(54) OPTIMIZED UEFI REBOOT PROCESS

(71) Applicant: Microsoft Technology Licensing, LLC., Redmond, WA (US)

(72) Inventors: Ramakoti R. Bhimanadhuni, Redmond, WA (US); Mallik Bulusu, Bellevue, WA (US); Brijesh Ramachandran, Redmond, WA (US); Bryan D. Kelly, Carnation, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 167 days.

(21) Appl. No.: 15/222,791

(22) Filed: Jul. 28, 2016

(65) Prior Publication Data

US 2018/0032349 A1    Feb. 1, 2018

(51) Int. Cl.
| | |
|---|---|
| *G06F 9/44* | (2018.01) |
| *G06F 9/4401* | (2018.01) |
| *G06F 3/06* | (2006.01) |
| *G06F 8/65* | (2018.01) |
| *G06F 8/654* | (2018.01) |

(52) U.S. Cl.
CPC .......... *G06F 9/4406* (2013.01); *G06F 3/0604* (2013.01); *G06F 3/0631* (2013.01); *G06F 3/0632* (2013.01); *G06F 3/0685* (2013.01); *G06F 8/65* (2013.01); *G06F 9/4401* (2013.01); *G06F 8/654* (2018.02)

(58) Field of Classification Search
CPC .... G06F 3/0604; G06F 3/0631; G06F 3/0632; G06F 3/0685; G06F 8/65; G06F 8/654; G06F 9/4401; G06F 9/4406
See application file for complete search history.

(56) References Cited

U.S. PATENT DOCUMENTS

| | | | |
|---|---|---|---|
| 8,082,436 B2 | 12/2011 | Harmer | |
| 9,189,248 B2 | 11/2015 | Lewis et al. | |
| 2007/0169076 A1* | 7/2007 | Desselle ................... | G06F 8/65 717/168 |

(Continued)

FOREIGN PATENT DOCUMENTS

CN    103034510 A    4/2013

OTHER PUBLICATIONS

"International Search Report and Written Opinion Issued in PCT Application No. PCT/US2017/040784", dated Dec. 20, 2017, 15 pages.

(Continued)

*Primary Examiner* — Fahmida Rahman
(74) *Attorney, Agent, or Firm* — Ray Quinney & Nebeker, P.C.; Thomas M. Hardman; Brandon K. Roper

(57) ABSTRACT

Systems and methods are disclosed for an initialization process that selectively reloads part or all of the UEFI when called by the operating system. The reload skips platform initialization and enables the selective loading of UEFI modules with tailored dependencies. A special protected region of memory is reserved and is not available for use by the host operating system. Once initialized, the UEFI will use the reserved memory region to execute code that initiates or loads UEFI modules. The host operating system will await the UEFI reload and then re-initialize the functions, structures and variables it receives from the UEFI.

15 Claims, 5 Drawing Sheets

(56) References Cited

U.S. PATENT DOCUMENTS

| | | | |
|---|---|---|---|
| 2009/0007089 A1* | 1/2009 | Rothman | G06F 8/65 |
| | | | 717/168 |
| 2010/0115202 A1 | 5/2010 | Zimmer et al. | |
| 2013/0086583 A1 | 4/2013 | Uemura et al. | |
| 2013/0262849 A1 | 10/2013 | Redheendran et al. | |
| 2013/0290778 A1 | 10/2013 | Soderlund et al. | |
| 2013/0297924 A1 | 11/2013 | Laue et al. | |
| 2014/0208089 A1 | 7/2014 | Satam et al. | |
| 2015/0074386 A1 | 3/2015 | Huang et al. | |
| 2015/0089209 A1 | 3/2015 | Jacobs et al. | |

OTHER PUBLICATIONS

Yao, et al., "A Tour beyond BIOS Memory Map Design in UEFI BIOS", Retrieved from <<https://firmwareintel.com/sites/default/filed/resources/A_Tour_Beyond_BIOS_Memory_Map_in%20UEFI_BIOS.pdf>> Feb. 17, 2015, 27 Pages.

Neosmart Technologies, "NeoSmart Knowledgebase; The BIOS/MBR Boot Process," pPublished on: Feb. 28, 2015, available at: https://neosmart.net/wiki/mbr-boot-process/, (17 pages).

* cited by examiner

OPTIMIZED UEFI REBOOT PROCESS

BACKGROUND

Firmware interfaces for computers, such as BIOS (Basic Input/Output System) and UEFI (Unified Extensible Firmware Interface), operate as interpreters between the operating system and the computer's firmware. BIOS or UEFI interfaces may be used at computer startup to initialize the hardware components and to start the operating system that is stored on the computer's hard drive. BIOS boots by reading the first sector on a hard disk and executing it; this boot sector in turn locates and runs additional code. UEFI boots by loading EFI program files (i.e., files having the .efi filename extensions) from a partition on the hard disk, known as the EFI System Partition (ESP). The EFI boot loader programs can take advantage of EFI boot services for things such as reading files from the hard disk.

Typically, BIOS or UEFI updates require a system reboot that results in downtime for users. Such reboots create a challenge coordinating downtime across a very large number servers in a distributed computing environment, such as a datacenter or cloud services network.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments disclosed herein create a new initialization process that selectively reloads part or all of the UEFI when called by the operating system. T The reload optionally skips platform initialization and enables the selective loading of UEFI modules with tailored dependencies. To achieve this reload, a special protected region of memory is reserved and is not available for use by the host operating system.

The host operating system can configure and call a UEFI initialization procedure to reload UEFI modules or portions of UEFI code. The operating system can call the UEFI initialization, at any time. In an example workflow, the reload may be called during Kernel Soft Reboot (KSR) during which the operating system is shut down to a loader stub and then updated operating system code is restarted and configuration, thereby completely skipping firmware Power-on Self-Test (POST). For example, the operating system code and data and the applications may be saved to memory prior to the reboot. The operating system code and data and the applications are then woke from the memory after rebooting the computer. Once initialized, the UEFI will use the reserved memory region to execute code that initiates or loads UEFI modules. The host operating system will await the UEFI reload and then re-initialize the functions, structures and variables it receives from the UEFI.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
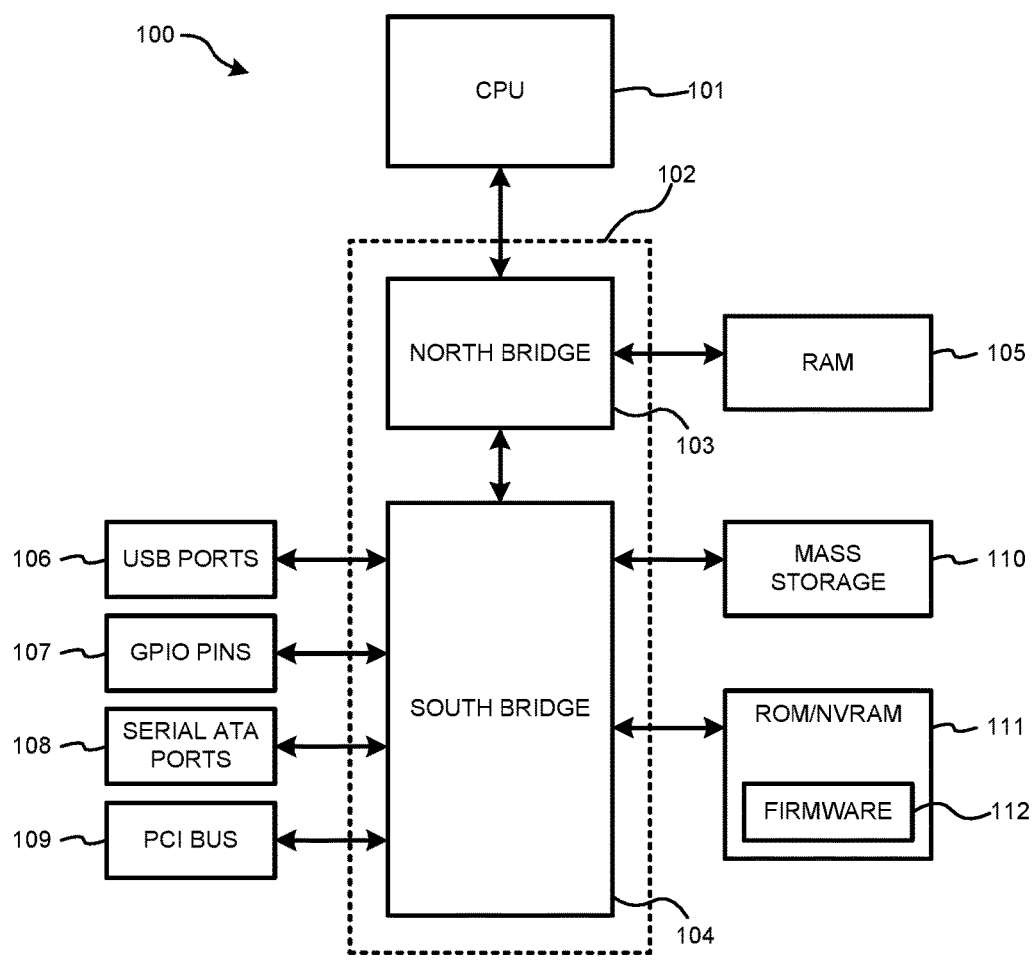
FIG. 1 is a representative computer architecture for practicing the disclosure presented herein.

Normal UEFI boot phases are as follows:

Security (SEC) phase is the first code executed to authenticate BIOS, update early microcode, and transfers code to PEI core. This code changes the CPU from real to protected model and enables cache as RAM for use in SEC and PEI phases.

Pre EFI Initialization (PEI) phase performs memory and chipset initialization. PEI Core and PEI Modules (PEIMs) get loaded. PEI phase loads the DXE core.

Driver Execution Environment (DXE) phase comprises the bulk of the BIOS initialization code. DXE drivers and interdependencies are executed in order.

Boot Device Selection (BDS) phase connects devices required for operating system load and hands control to the operating system.

In the Transient System Load (TSL) phase, control is handed to the operating system and the operating system is booting.

In the Run Time (RT) phase, the operating system is running and has control of the system.

The After Life (AL) phase transitions from the final operating system environment (i.e., shutdown). Handoff from this phase can enter the PEI or DXE phases.

The changes required to enable new modes of UEFI firmware update are outlined below. To achieve these new update modes, the firmware requires restructuring of EFI modules and changes to the operating system boot services.

UEFI Architectural Changes:

1) A new isolated area of memory is reserved for UEFI execution. UEFI code always executes in this reserved memory region. The operating system does not have access to this protected area of memory. The memory region is only accessible in UEFI initialization and System Management Mode (SMM) modes of operation.

2) SMM regions of memory are extended and structured to permit runtime modification of existing System Management Interrupt (SMI) routines. Reserved SMM code requires sufficient buffer to allow for the run-time modification of the code.

3) Restructuring and modularization of FVMAIN and UEFI EDKII (EFI Development Kit II) is required to permit DXE services to become patchable and new short-cut paths that independently initialize modules from a manifest and load their dependent modules.

4) A Kernel Boot Service feature is implemented in the shutdown and Boot Services for a S3 hybrid resume type reload of the system with select DXE module execution. UEFI transfers control by waking the Operating System Power Management (OSPM) and transferring control to the Firmware ACPI Control Structure (FACS) waking vector.

5) In normal S3 resume, the execution of DXE phase is avoided altogether, and the S3 resumes from a saved boot script path. This boot script is stored in non-volatile random-access memory (NVRAM) and during S3 resume the boot script engine executes restoring the configuration. Manipulation of this boot script, whereby save and restore mechanism already exist, can facilitate a patching process for DXE modules EFI Firmware Update Modes The improved UEFI implements four different levels of firmware: Runtime Update, OS Kernel Reboot Complement, Fast Boot, and Cold Boot. These modes are discussed in further detail below.

Runtime Update Mode.

The firmware is updated or patched while the host operating system is in a fully operational state. UEFI code is loaded, and the operating system loads or re-initializes the driver or component with the corresponding functionality. Examples of runtime update mode include:

Static Content: The ACPI table contents are updated in UEFI. The operating system ACPI driver is re-initialized to read-in the new content.

New Function: A new Device Specific Method (DSM) is added or loaded into the UEFI reserved memory region. The DSM exposes new device functionality. The operating system loads the new driver that leverages the DSM.

System Management Interrupt: Existing SMM instruction code is updated in SMM memory region. This requires additional memory be reserved for SMM. An SMI is required for updating SMM isolated execution environment. This requires UEFI authenticated variable design.

OS Kernel Reboot Complement Mode.

Firmware updates are performed before the operating system kernel is rebooted. Upon reboot of the kernel, as the kernel goes down the After Live (AL) code calls, a special restart to the UEFI persists memory by putting memory into self-refresh. The restart mode causes a minimal S4 wake-like load to occur, exiting boot services directly back to the kernel. This mode permits minimum driver load/reload.

To successfully optimize kernel reboot, the FVMAIN code block is restructured and optimized to facilitate a runtime modular load. A customizable manifest or module list determines the DXE modules that need to be loaded. The manifest is provided with the update to direct the firmware on what components have been updated. Examples of operating system kernel reboot complement mode include:

System Management Interrupt: The DXE phase modules typically perform SMM Init( ) whereby SMM Intrinsic Services are loaded into SSM Handler. A new SMI is added/removed during limited reload of the DXE phase.

Patch EFI System Table: Updates to EFI Data Structure or System table.

Update DXE Driver: Updates to DXE driver, Protocol or MMIO resource.

Fast Boot Mode.

Fast boot is a time optimized version of reboot. It is detected early in the PEI phase and skips loading certain features and unnecessary functions. Fast boot does not re-initialize memory or perform PCIe link training. During the BDS phase, fast boot skips boot device checks and goes to default device. Fast boot preserves memory contents by keeping memory in self-refresh during reboot. By disabling BIOS output and BIOS screen options and only loading limited drivers and service, fast boot can optimize reboot time.

Cold Boot Mode.

The cold boot mode performs the tradition full boot configuration, initializes sysboot options and pin strapped HW variables, and performs memory and PCIe initialization.

FIG. 1 is a representative computer architecture for practicing the disclosure presented herein. The following discussion of FIG. 1 is intended to provide a brief description of the general computing environment, which may implement embodiments of the systems and methods disclosed herein. Those skilled in the art will appreciate that the embodiments described herein may be implemented using other computer system configurations, including multiprocessor systems, microprocessor-based or programmable electronics, minicomputers, mainframe computers, and the like. Embodiments described herein may also be practiced in a distributed computing environments, such as a datacenter or cloud services network, where tasks are performed by distributed processing devices that are linked through a communications network.

While the embodiments described herein may be described in terms of program modules that operate in conjunction with the execution of a computer firmware, those skilled in the art will recognize that they may also be implemented in combination with other program modules. Generally, the program modules may include code, programs, components, data structures, or other structures that perform particular tasks or implement particular data types. In a distributed computing environment, the program modules may be located in both local and remote memory storage devices.

FIG. 1 illustrates a computer architecture for a computer 100 that includes a baseboard, or "motherboard", such as a printed circuit board on which a multitude of components or devices may be connected by way of a system bus or other communication path. It is also contemplated that the computer 100 may not include each of the components shown in FIG. 1, may include additional components that are not explicitly shown in FIG. 1, or may utilize an architecture completely different than that shown in FIG. 1.

Central processing unit ("CPU") 101 operates in conjunction with a chipset 102. CPU 102 may be a standard microprocessor that execute various arithmetic and logical operations necessary for the operation of the computer 100. In one embodiment, chipset 102 includes a north bridge 103 and a south bridge 104. The north bridge 103 provides an interface between the CPU 101 and the remainder of the computer 100. The north bridge 103 also provides an interface to random access memory ("DRAM") 105, which is used as the main system memory in the computer 100. The north bridge 103 may also include interface functionality for connecting to networking adapters, graphics adapters, or other components (not shown). The north bridge 103 is connected to the south bridge 104.

The south bridge 104 is responsible for controlling many of the input/output (I/O) functions of the computer 100. In particular, the south bridge 104 may provide the interface to one or more of universal serial bus ("USB") ports 106, general purpose input/output ("GPIO") pins 107, serial advanced technology attachment ("ATA") ports 108, or peripheral component interconnect ("PCI") bus 109. The south bridge 104 may also provide an interface to power management circuitry and clock generation circuitry (not shown).

The south bridge 104 also provides interfaces for connecting to one or more mass storage devices 110 to the computer 100. A mass storage device 110 may be, for example, a hard disk or CD-ROM drive. However, it will be understood by those skilled in the art that mass storage device 110 may comprise any computer storage media, including volatile and non-volatile, removable and non-removable media implemented in any method or technology for storage of information such as computer-readable instructions, data structures, program modules or other data. Mass storage device 110 may store, for example, an operating system and application programs. An operating system typically comprises a set of programs that control operations and allocation of resources on computer 100. An application program is software code that runs on top of the operating system software and uses resources on computer 101 as made available through the operating system to perform application-specific tasks.

A computer storage media 111, such as ROM, non-volatile random access memory ("NVRAM") or flash memory, stores firmware 112 comprising program code that contains the basic routines that are used to start up the computer 100 and to transfer information between elements within the computer 100. The firmware 112 may also comprise a Basic Input/Output System ("BIOS") firmware image. Firmware 112 may be compatible with the Unified Extensible Firmware Interface (UEFI) specification.

The purpose of firmware image 111 is to prepare the computer system 100, such as by initializing CPU 101, chipset 102, memory 105, etc., so that the operating system can be booted. Firmware 112 loads specific patches or code required by the components of computer 100. Once the operating system has been booted to computer system 100, the user can load software applications. In the cloud computing environment, computer 100 may be a server in a datacenter running multiple virtual machines (VMs) in RAM 105. Multiple cloud customers may share the VM resources on computer 100 and may run various software applications in their own contexts on different VMs.

If an update needs to be applied to firmware 112, such as a patch that addresses a security flaw, then memory 111 is updated with new firmware. In existing systems, once firmware 112 is updated, then computer system 100 must be restarted. Following the restart, all of the context in RAM 105 (e.g., VMs and user applications) is wiped out.

Figure 2:
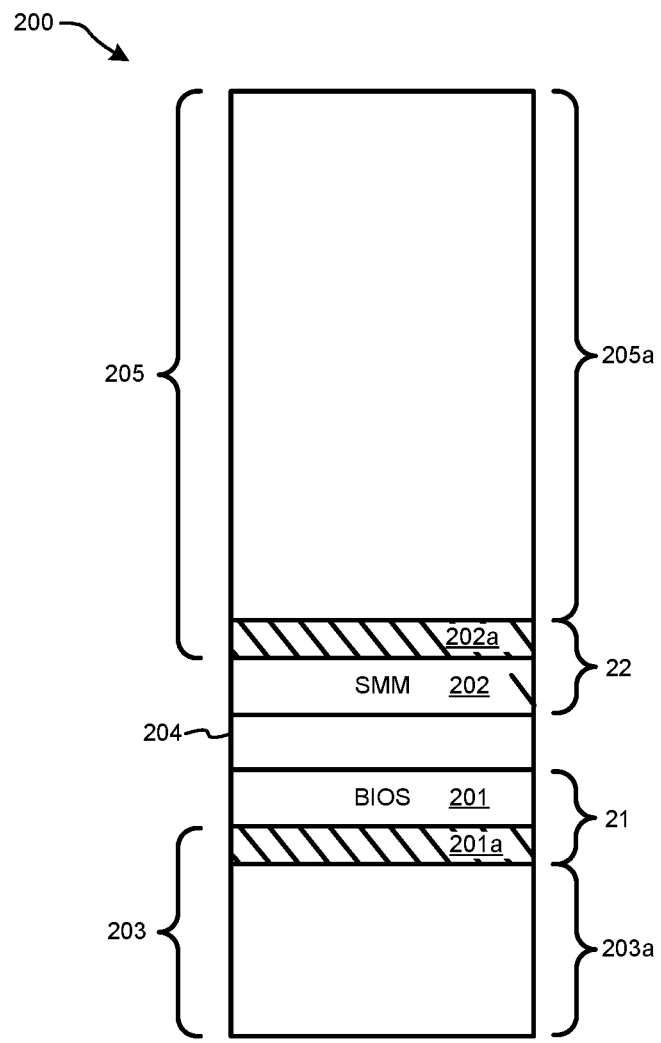
FIG. 2 illustrates a volatile system memory.

The optimized UEFI reboot process described herein allows the computer system 100 to apply mandatory firmware updates without wiping out all of the user context in RAM 105. To make this happen, reboot methods are modified to jump over memory initialization code in BIOS. This preserves the memory context so that control can be returned to the operating system after reboot so that users can continue accessing their resources with minimal down time (e.g., without needing to restart VMs and user applications). In one embodiment, a firmware update reboot may be indicated, for example, by a flag set in CMOS or a variable set in memory. During reboot following a firmware update, after determining that the flag or variable is set, the UEFI boot process jumps from the AL phase directly to the DXE phase. This modified process skips any memory initialization in the PEI phase so that the existing context is maintained. In other embodiments, a small portion of the PEI phase may be executed, such as initializing non-memory components and loading the DXE core. Additionally, the DXE phase may be divided into different firmware volumes so that based upon the type of security flaw FIG. 2 illustrates a system memory 200, such as RAM 105. During initial startup in current computer systems, the UEFI configures and releases a large part of the memory 200 for use by the operating system. However, the UEFI also locks down certain portions of memory 200 for system operations and protects these portions from access by the operating system. For example, during initialization on startup, the UEFI may reserve area 201 for BIOS operations and area 202 for system management functions. In existing computer systems, the UEFI releases the remaining memory areas 203-205 to the operating system for use in running applications, etc.

However, in the embodiments disclosed herein, the UEFI reserves additional BIOS and system management memory regions 201a and 202a on startup. For example, on startup, the UEFI reserves memory region 21 for BIOS operations. This includes region 201, which has a size selected based upon the BIOS operations required in the current UEFI firmware image. The UEFI also reserves region 201a, which provides additional reserved memory for BIOS operations use in future UEFI firmware images. Region 201a is not used following the initial startup or full system boot. The size of region 201a may be selected based upon the size of region 201, such as an additional percentage above the space required for region 201, or may be a set amount, such as a predetermined number of bytes. For example, region 201a may be equivalent to 10-20% of the size of region 201 or may be N kB.

Similarly, the UEFI reserves memory region 22 for system management operations. This includes region 202, which has a size selected based upon the system management operations required in the current UEFI firmware image. The UEFI also reserves region 202a, which provides additional reserved memory for system management operations use in future UEFI firmware images. Region 202a is not used following the initial startup or full system boot. The size of region 202a may be selected based upon the size of region 202, such as an additional percentage above the space required for region 202, or may be a set amount, such as a predetermined number of bytes. For example, region 202a may be equivalent to 10-20% of the size of region 202 or may be N kB. The reservation of region 202a may be accomplished in addition to or instead of reserving region 201a.

With the extra regions 201a and 202a reserved for use by future UEFI firmware BIOS or system management operations, the UEFI releases regions 203a, 204, and 205a to the operating system for use.

At a later time, the UEFI firmware image may be updated, such as to patch certain security flaws. In order to apply the new UEFI firmware image, the computer needs to be rebooted. In existing systems, the reboot would cause all of memory 200 to be reinitialized in the PEI phase. This would result in all of the operating system and application context in memory regions 203-205 to be wiped out. However, in embodiments that project additional memory regions 201a and/or 202a, the operating system and application context in regions 203a, 204, and 205a can be preserved during reboot. The reboot will reformats regions 21 and 22 and new BIOS and operating system operations will be installed in those regions. Because regions 21 and 22 include reserved regions 201a and 202a, there is excess room available on reboot to implement additional BIOS and system management operations that were not present in the original UEFI firmware image. For example, if a security patch causes additional lines of code to be added to the region 202 reserved for system operations, then additional reserved region 202a is available for those extra lines of code following the UEFI firmware update reboot. Otherwise, without reserved region 202a, the extra lines of code would require remapping of memory 200, which would wipe out the context for the operating system and applications.

Figure 3:
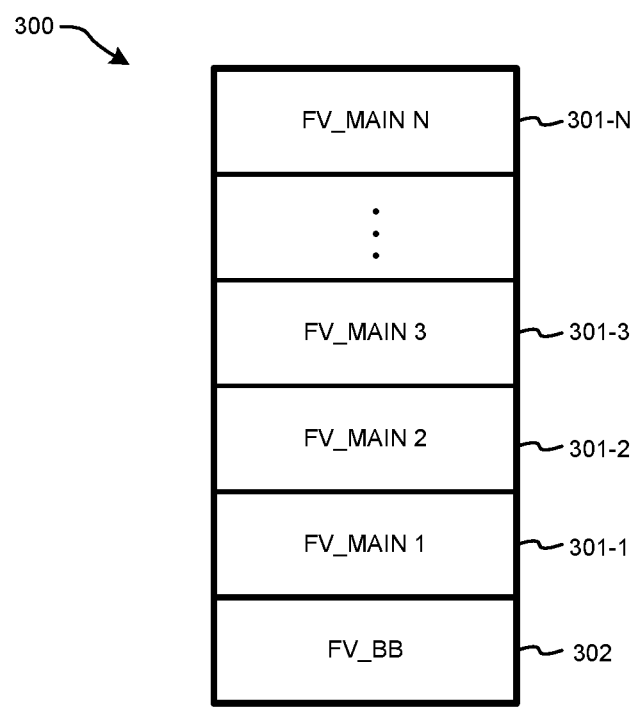
FIG. 3 illustrates a segmented firmware image on a non-volatile system memory.

FIG. 3 illustrates a modularized UEFI firmware image 300 according to one embodiment. Firmware image 300 may be stored as firmware 112 on ROM/NVRAM memory 111 (FIG. 1) in an example embodiment. In existing systems, when firmware 112 needs to be updated, the entire image must be written or flashed to memory 111. In the embodiment illustrated in FIG. 3, the firmware image is modularized into N sections 301. Instead of flashing an entire new firmware 300 to memory 111, only the updated segments 301 need to be flashed to memory 111. For example, if a bug is found in segment FV_MAIN 2 (301-2), then only that segment needs to be updated on memory 111. The computer may then be rebooted to apply only the updated segment 301. This allows the post-upgrade reboot to skip the firmware code in the boot block (FV_BB) 302, which avoids re-initialization of the memory. Therefore, the operating system and application context in the system RAM memory will not be wiped out in the reboot.

During the reboot, the operating system and applications may be placed in a sleep mode. The normal S3 sleeping state is a low wake-up latency sleeping state where all system context is lost except system memory. CPU, cache, and chip set context are lost in this state. Hardware maintains memory context and restores some CPU and L2 configuration context. Control starts from the processor's reset vector after the wake-up event. A S3 hybrid resume type reload of the system with select DXE module execution may be used to transfer control to the operating system after updating UEFI firmware and rebooting the computer. UEFI will transfer control by waking the Operating System Power Management (OSPM) and transferring control to the Firmware ACPI Control Structure (FACS) waking vector. The wake vector can be used to tell the operating system that reboot is complete and that control is transferred to the operating system.

Figure 4:
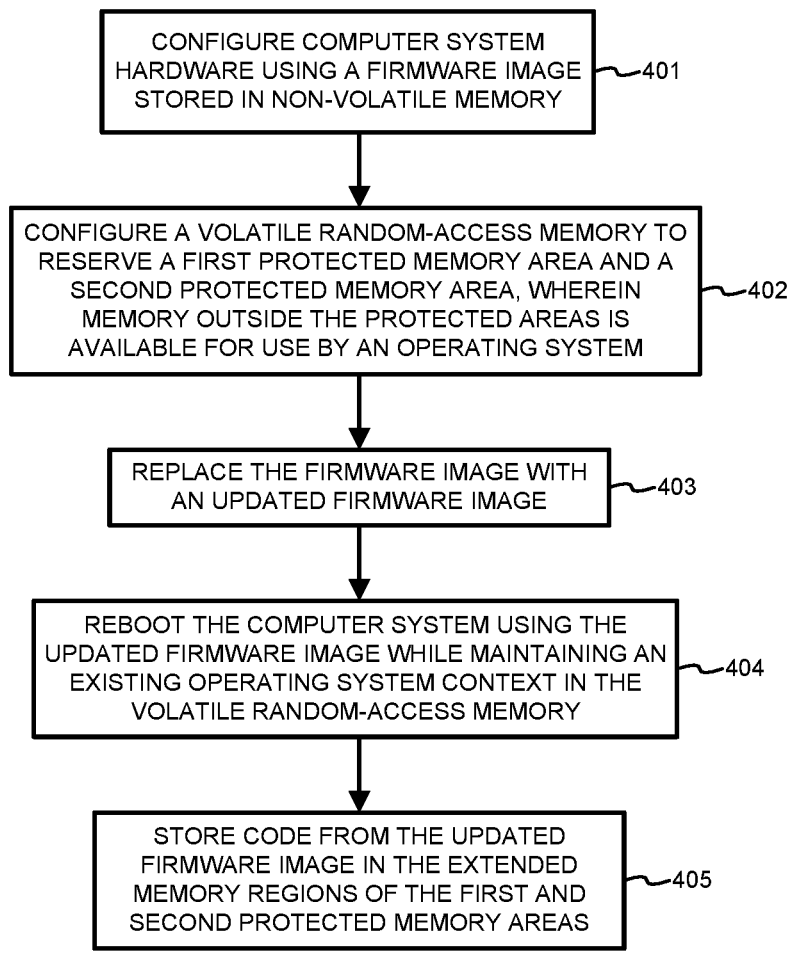
FIG. 4 is a flowchart illustrating a method for booting a computer system according to one embodiment.

FIG. 4 is a flowchart illustrating a method for booting a computer system according to one embodiment. In step 401, computer system hardware is configured using a firmware image stored in non-volatile memory. In step 402, a volatile random-access memory is configured to reserve a first protected memory area and a second protected memory area, wherein memory outside the protected areas is available for use by an operating system.

The first and second protected memory areas comprise a standard memory region and an extended memory region, wherein the extended memory region is not used to store code during the initial system boot but is configured to be available to store code from an updated firmware image following a system reboot.

The first and second protected memory areas may be designated on initial system boot for use by UEFI code, BIOS code, or system management code.

In step 403, the firmware image is replaced with an updated firmware image. In step 404, the computer system is rebooted using the updated firmware image while maintaining an existing operating system context in the volatile random-access memory. In step 405, code from the updated firmware image is stored in the extended memory regions of the first and second protected memory areas.

Figure 5:
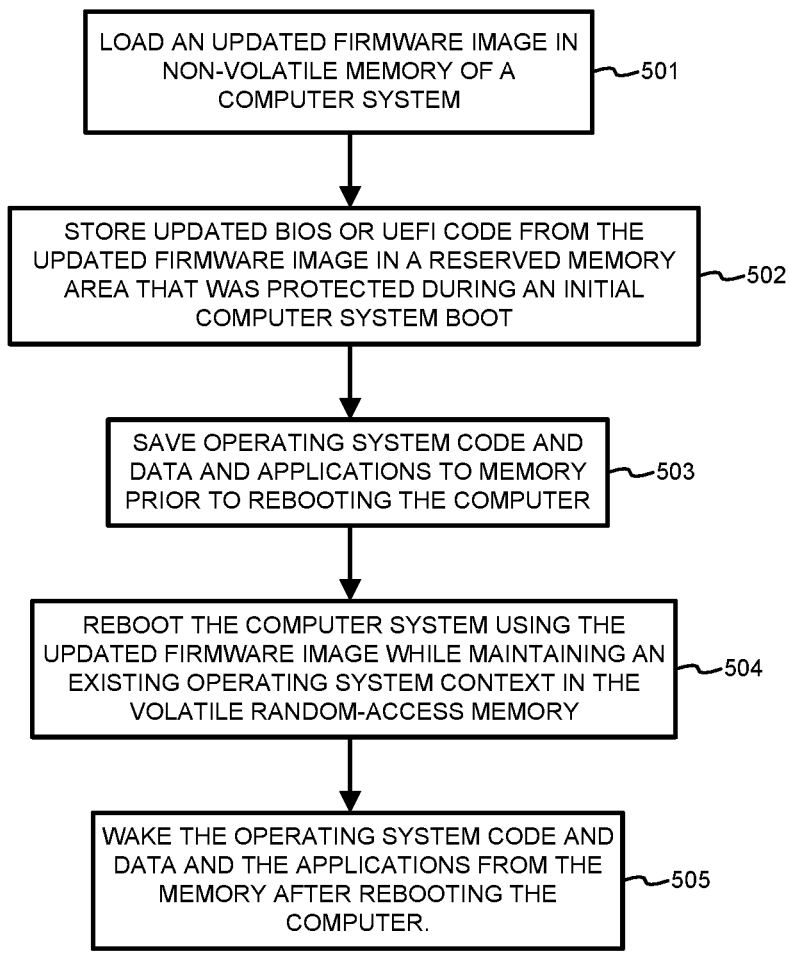
FIG. 5 is a flowchart illustrating a method for rebooting a computer system.

FIG. 5 is a flowchart illustrating a method for rebooting a computer system. In step 501, an updated firmware image is loaded in non-volatile memory of a computer system. In step 502, updated BIOS or UEFI code from the updated firmware image is stored in a reserved memory area that was protected during an initial computer system boot. The reserved memory area is an area of volatile random-access memory that has been protected from use by an operating system. The volatile random-access memory comprises a standard memory region and an extended memory region, wherein the extended memory region is not used to store code during the initial computer system boot but is configured to be available to store code in the updated firmware image following a system reboot.

In step 503, the operating system code and data and the applications are stored to memory prior to rebooting the computer. In step 504, the computer system is rebooted using the updated firmware image while maintaining an existing operating system context in the volatile random-access memory. In step 505, the operating system and the applications are waked from the memory after rebooting the computer.

An example computer system comprises: a processor; a non-volatile memory configured to store a firmware image comprising code used to boot the system; and a volatile random-access memory comprising a first reserved region and one or more additional regions available for use by an operating system; wherein the first reserved region comprises an extended memory region that is reserved during an initial system boot but is not used to store code during the initial system boot, the first reserved region configured to be available to store code in an updated firmware image following a system reboot.

In alternative systems, the first reserved region is designated on initial system boot for use by Basic Input/Output System (BIOS) code or by system management code.

Alternative systems further comprise a second reserved region in the volatile random-access memory that is designated on initial system boot for use by BIOS code or by system management code.

In alternative systems, the non-volatile memory is read only memory (ROM) or non-volatile random access memory (NVRAM).

In alternative systems, the firmware image further comprises a plurality of firmware volume sections, each section configured to be independently replaced as needed during a firmware update.

An example method for booting a computer system comprises: configuring computer system hardware using a firmware image stored in non-volatile memory; and configuring a volatile random-access memory to reserve a first protected memory area and a second protected memory area, wherein memory outside the protected areas is available for use by an operating system; the first and second protected memory areas comprising a standard memory region and an extended memory region, wherein the extended memory region is not used to store code during the initial system boot but is configured to be available to store code from an updated firmware image following a system reboot.

In alternative methods, the first and second protected memory areas are designated on initial system boot for use by Basic Input/Output System (BIOS) code or Unified Extensible Firmware Interface (UEFI) code or by system management code.

Alternative methods further comprise: replacing the firmware image with an updated firmware image; rebooting the computer system using the updated firmware image while maintaining an existing operating system context in the volatile random-access memory; and storing code from the updated firmware image in the extended memory regions of the first and second protected memory areas.

Alternative methods further comprise: saving operating system code and data and applications to memory prior to the rebooting; and waking the operating system code and data and the applications from the memory after rebooting the computer.

In alternative methods, the firmware image further comprises a plurality of firmware volume sections, each section configured to be independently replaced as needed during a firmware update.

Alternative methods further comprise: replacing one or more firmware volume sections with an updated firmware image section; rebooting computer using an updated firmware image while maintaining an existing operating system context in the volatile random-access memory; and storing code from the updated firmware image in the extended memory regions of the first and second protected memory areas.

In alternative methods, the updated firmware image comprises one or more new firmware volume sections and at least one firmware volume section from a prior firmware image.

An example method for rebooting a computer system comprises: loading an updated firmware image; rebooting the computer system using the updated firmware image while maintaining an existing operating system context in the volatile random-access memory; and storing updated Basic Input/Output System (BIOS) or Unified Extensible Firmware Interface (UEFI) code from the updated firmware image in a reserved memory area that was protected during an initial computer system boot.

In alternative methods, the reserved memory area is an area of volatile random-access memory that has been protected from use by an operating system.

In alternative methods, the volatile random-access memory comprises a standard memory region and an extended memory region, wherein the extended memory region is not used to store code during the initial computer system boot but is configured to be available to store code in the updated firmware image following a system reboot.

Alternative methods further comprise: saving operating system code and data and applications to memory prior to rebooting the computer; and waking the operating system code and data and the applications from the memory after rebooting the computer.

In alternative methods, the firmware image further comprises a plurality of firmware volume sections, and wherein the updated firmware image comprises replacing an original firmware volume section with an updated firmware volume section.

Alternative methods further comprise: rebooting computer using an updated firmware image while maintaining an existing operating system context in the volatile random-access memory; and storing code from the updated firmware image in the extended memory region of the first and second protected memory areas.

In alternative methods, the updated firmware image comprises one or more new firmware volume sections and at least one firmware volume section from a prior firmware image.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer system comprising:
   a processor;
   a non-volatile memory configured to store a firmware image comprising code used to boot the computer system;
   a volatile random-access memory comprising a first reserved region and one or more additional regions available for use by an operating system, wherein the first reserved region comprises an extended memory region that is reserved during an initial system boot but is not used to store code during the initial system boot performed by the firmware image, the first reserved region configured to be available to store code from an updated firmware image following a system reboot; and
   instructions executable by the processor to perform a firmware update that comprises a type of reboot with the updated firmware image that reformats the first reserved region while preserving the operating system and application context in the one or more additional regions by skipping memory initialization code in the updated firmware image.

2. The system of claim 1, wherein the first reserved region is designated on the initial system boot for use by Basic Input/Output System (BIOS) code or by system management code.

3. The system of claim 2, further comprising:
   a second reserved region in the volatile random-access memory that is designated on the initial system boot for use by BIOS code or by system management code.

4. The system of claim 1, wherein the non-volatile memory is read only memory (ROM) or non-volatile random access memory (NVRAM).

5. A method for booting a computer system, comprising:
   configuring computer system hardware using a firmware image stored in non-volatile memory;
   configuring a volatile random-access memory to reserve a protected memory area, wherein memory outside the protected memory area is available for use by an operating system, wherein the protected memory area comprises a standard memory region and an extended memory region, and wherein the extended memory region is not used to store code during an initial system boot performed by the firmware image but is configured to be available to store code from an updated firmware image following a system reboot; and
   performing a firmware update that comprises a type of reboot with the updated firmware image that reformats the protected memory area while preserving the operating system and application context in the memory outside the protected memory area by skipping memory initialization code in the updated firmware image.

6. The method of claim 5, wherein at least part of the protected memory areas are designated on the initial system boot for use by Basic Input/Output System (BIOS) code or Unified Extensible Firmware Interface (UEFI) code or by system management code.

7. The method of claim 5, further comprising:
   replacing the firmware image with the updated firmware image;
   rebooting the computer system using the updated firmware image while maintaining an existing operating system context in the volatile random-access memory; and
   storing code from the updated firmware image in the extended memory regions of the protected memory areas.

8. The method of claim 7, further comprising:
   saving operating system code and data and applications to memory prior to the rebooting; and
   waking the operating system code and data and the applications from the memory after rebooting the computer.

9. The method of claim 5, further comprising:
replacing one or more firmware volume sections with the updated firmware image section;
rebooting computer using the updated firmware image while maintaining an existing operating system context in the volatile random-access memory; and
storing code from the updated firmware image in the extended memory regions of the protected memory areas.

10. The method of claim 5, wherein the updated firmware image comprises one or more new firmware volume sections and at least one firmware volume section from a previous firmware image.

11. A method for rebooting a computer system, comprising:
loading an updated firmware image into a protected memory area, wherein the protected memory area comprises an extended memory region that was not used to store code during an initial computer system boot performed by a previous firmware image;
rebooting the computer system using the updated firmware image while maintaining an existing operating system context in regions of volatile random-access memory outside the protected memory area by skipping memory initialization code in the updated firmware image; and
subsequent to the rebooting, storing updated Basic Input/Output System (BIOS) or Unified Extensible Firmware Interface (UEFI) code from the updated firmware image in a reserved memory area that was protected during the initial computer system boot.

12. The method of claim 11, wherein the reserved memory area is an area of the volatile random-access memory that has been protected from use by an operating system.

13. The method of claim 12, wherein the volatile random-access memory comprises a standard memory region and an extended memory region, wherein the extended memory region is not used to store code during the initial computer system boot but is configured to be available to store code in the updated firmware image following a system reboot.

14. The method of claim 11, further comprising:
saving operating system code and data and applications to memory prior to rebooting the computer; and
waking the operating system code and data and the applications from the memory after rebooting the computer.

15. The method of claim 11, wherein the updated firmware image comprises one or more new firmware volume sections and at least one firmware volume section from a prior firmware image.

* * * * *